July 6, 1943.    R. I. MARKEY    2,323,823

JOINT FOR EXHAUST MANIFOLD SYSTEMS

Filed July 10, 1942

INVENTOR.
ROSCOE I. MARKEY
BY
Geo. A. Senior
ATTORNEY

Patented July 6, 1943

2,323,823

UNITED STATES PATENT OFFICE 2,323,823

JOINT FOR EXHAUST MANIFOLD SYSTEMS

Roscoe I. Markey, East Orange, N. J., assignor to Pollak Manufacturing Company, Arlington, N. J., a corporation of New Jersey Application July 10, 1942, Serial No. 450,461

3 Claims. (Cl. 285—92)

The invention relates to joints for exhaust manifold systems and particularly to joints or connections for use in manifold systems for aircraft engines.

The exhaust manifold or collector system for what is known as a radial-type engine comprises a hollow annular member having a plurality of branch pipes leading to the engine cylinders and a tail or outlet pipe leading from the hollow annular member. The manifold system is placed in close proximity to the engine and there is considerable expansion and contraction in the entire system due to the great heat developed by the engine while in operation and the hot gases discharged into the system. It is therefore impossible or highly impractical to provide rigid connections between the parts. The branch pipes, the outlet pipe and ofttimes the hollow annular member itself must be provided with joints which will positively hold the parts together and yet at the same time be sufficiently flexible to compensate for the changes in dimensions due to expansion and contraction caused by heating and cooling.

The principal object of the present invention is to provide a joint that will efficiently serve in such exhaust manifold systems.

Another object of the invention is to provide a joint of this character which is extremely simple in construction thus lending itself to economy of manufacture and ease of installation.

In the manufacture of exhaust manifolds to which the invention relates, welding is largely employed. Ofttimes the parts will not be positioned with a great deal of precision. One of the important objects of the invention is that the flexibility of the joint readily compensates for slight inaccuracies, thus facilitating the installation of the system and renewal of worn parts. A system is thus provided which guarantees practically 100% interchangeability. While radial-type engines have been particularly spoken about it will be obvious the joint is just as applicable to exhaust manifolds for engines having their cylinders in line or other types of engines.

Still another important object of the invention is to provide a joint which freely permits of angular movement of the parts connected together while at all times maintaining adequate and efficient gas-tight connections between the parts and to provide unobstructed passage of heated fluids from the combustion engine exhaust parts.

My invention further consists in various other features and improvements illustrated in the drawing and hereinafter more particularly described and claimed.

Attention is hereby directed to the drawing in which a preferred embodiment of the invention is illustrated and in which similar numerals of designation refer to similar parts throughout the views, and in which.

Figure 1:
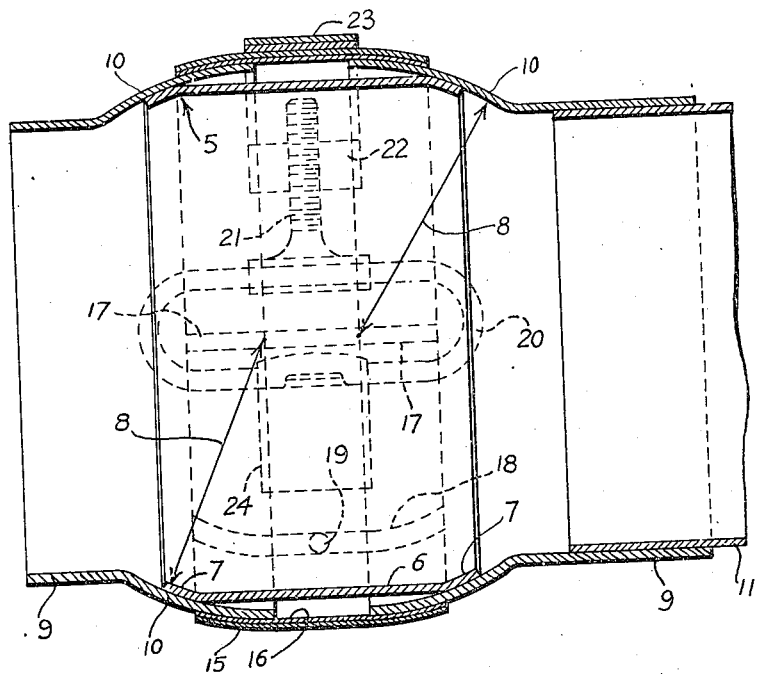
Figure 1 is a longitudinal sectional view.
Figure 2:
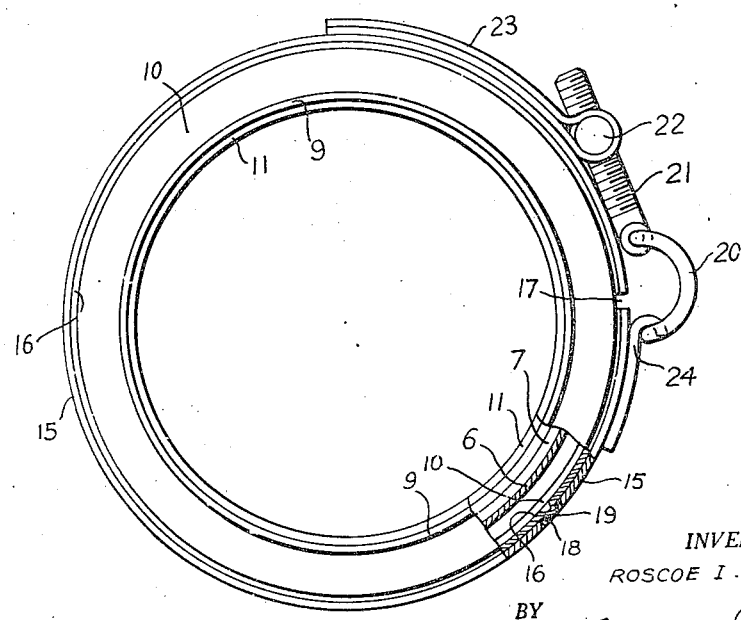
Figure 2 is an end elevation with a part in section.

The invention has to do with a joint of a type somewhat analogous to that disclosed in my prior Patent No. 2,226,936, dated December 31, 1940.

Referring again to said drawing a spacer 5 is provided. This spacer has a straightway intermediate portion 6 and curved ends 7, the curvature being in the arc of a circle, the radius of which is indicated by the broken lines 8.

Short tubes 9—9 have bell-shaped ends 10 which engage and cooperate with the curved ends 7 of the spacer 5. The bell-shaped ends are spherical in contour and their radii are struck from the same centers as that of the curved ends 7 of the spacer as indicated by the broken lines 8—8. It will thus be apparent the tubes 9—9 and their connecting parts may have considerable angular displacement in relation to each other while maintaining the surface contact between the curved ends of the spacer, and the bell-shaped ends of the tubes, thus insuring against the escape of the products of combustion. One of the tubes 9 may be somewhat short and have the connecting part (not shown) welded or brazed to it and the other might be somewhat longer to permit of the connecting part 11 having sliding movement in relation thereto so that a certain amount of axial or longitudinal movement is provided for.

The bell ends 10 of the tubes 9 are maintained in proper relation to each other by a split clamping member 15 which has a liner 16 that is also split. The liner acts as a reinforcement to the split clamping member and functions to take up wear. It is inexpensive and easily renewable when worn and thus the life of the clamping member is greatly prolonged. Both the liner and the clamping member have intermediate straightaway portions and curved ends. The curvature of the ends coincides with the curvature of the bell ends 10 so as to permit of angular displacement of the pipes 9 while maintaining a gas-tight connection.

The opening or gap 17 in the liner is spaced away from the opening or gap 18 in the clamping member thus insuring against the escape of gases from the joint. In order to make certain the gaps 17 and 18 will not become aligned a dimple 19 is struck up from the liner and this dimple engages the slot 18 in the clamping member and prevents rotation of the clamping member and its liner in relation to each other when the parts are properly assembled.

Another feature of the invention is that the tubes 9 or the members to which they are attached may be in effect moved latterly in relation to each other. This is extremely useful where, due to some inaccuracy, the two parts to be connected are not in line with each other, or where one part is fixed and the other subject to a vibratory movement.

Means are provided for firmly securing the ends of the split clamping member together, this means having particularly in mind to permit of diametrical expansion and contraction of the clamping member to compensate for such changes due to heating and cooling of the parts.

A locking member 20 of elongated ring-like formation is pivoted in one end of a threaded stud 21. The stud is threaded into a cross head 22 pivoted in one end of a strap 23 welded or otherwise secured to the clamping member. A hook 24 is secured to the clamping member on the opposite side of the slot 18 from which the locking ring 20 is mounted. The locking ring 20 engages the hook 24 when the parts are in their locked position. The locking member 20 due to its shape and resiliency permits of expansion and contraction. The threaded stud 21 permits of adjustments for slightly varying diameters of pipes or other slight inaccuracies.

Such changes in detail of construction and arrangements of parts as would occur to one skilled in the art are to be considered as coming within the spirit of the invention as set forth in the appended claims.

I claim:

1. A joint for an exhaust manifold system, said joint having in combination, a spacer for a pair of tubular members of said exhaust manifold system, said spacer having a wall thickness substantially the same as that of said tubular members, a straightaway intermediate portion on said spacer and curved end portions, bell-shaped ends on said tubular members, the curved ends on said spacer conforming to the curvature of said bell-shaped ends and cooperating therewith so as to permit of angular displacement of said tubular members in relation to each other while maintaining gas-tight relations, and a split clamping member permitting of diametrical expansion and contraction of said joint and for maintaining said bell-shaped ends of said tubular members in proper relation to each other and preventing the escape of gases, said split clamping member having an intermediate straightaway portion and curved portions conforming to the curvature of said bell-shaped ends, the centers of the bell-shaped ends of the pipes and the curved end portions of the spacer and the curved end portions of the split clamping member being on the longitudinal axis of the joint and spaced apart from each other.

2. A joint for an exhaust manifold system, said joint having in combination, a spacer for a pair of tubular members of said exhaust manifold system, said spacer having a wall thickness substantially the same as that of said tubular members, a straightaway intermediate portion on said spacer and curved end portions, bell-shaped ends on said tubular members, the curved ends on said spacer conforming to the curvature of said bell-shaped ends and cooperating therewith so as to permit of angular displacement of said tubular members in relation to each other while maintaining gas-tight relations, a split clamping member permitting of diametrical expansion and contraction of said joint and for maintaining said bell-shaped ends of said tubular members in proper relation to each other and preventing the escape of gases, a split liner for said split clamping member, said split liner and said split clamping member having intermediate straightaway portions and curved portions conforming to the curvature of said bell-shaped ends, and means for preventing rotation of said clamping member in relation to said liner, the centers of the bell-shaped ends of the pipes and the curved end portions of the spacer and the curved end portions of the split clamping member being on the longitudinal axis of the joint and spaced apart from each other.

3. A joint for an exhaust manifold system, said joint having in combination, a spacer for a pair of tubular members of said exhaust manifold system, said spacer having a wall thickness substantially the same as that of said tubular members, a straightaway intermediate portion on said spacer and curved end portions, bell-shaped ends on said tubular members, the curved ends on said spacer conforming to the curvature of said bell-shaped ends and co-operating therewith so as to permit of angular displacement of said tubular members in relation to each other while maintaining gas-tight relations, and a split clamping member permitting of diametrical expansion and contraction of said joint and for maintaining said bell-shaped ends of said tubular members in proper relation to each other and preventing the escape of gases, said split clamping member having an intermediate straightaway portion and curved portions conforming to the curvature of said bell-shaped ends, said split clamping member being free to move in relation to said spacer so that said tubular members may be moved latterly in relation to each other, the centers of the bell-shaped ends of the pipes and the curved end portions of the spacer and the curved end portions of the split clamping member being on the longitudinal axis of the joint and spaced apart from each other.

ROSCOE I. MARKEY.